United States Patent
Hofmann et al.

(10) Patent No.: US 10,125,217 B2
(45) Date of Patent: *Nov. 13, 2018

(54) METHOD FOR PRODUCING POLYETHER CARBONATE POLYOLS

(71) Applicant: Covestro Deutschland AG, Leverkusen (DE)

(72) Inventors: Jörg Hofmann, Krefeld (DE); Hans-Georg Pirkl, Leverkusen (DE); Kai Laemmerhold, Shanghai (CN); Hartmut Nefzger, Pulheim (DE); Matthias Wohak, Dormagen (DE); Stefanie Braun, Köln (DE); Christoph Gürtler, Köln (DE); Aurel Wolf, Wülfrath (DE); Jens Langanke, Mechernich (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/030,523

(22) PCT Filed: Oct. 20, 2014

(86) PCT No.: PCT/EP2014/072389
§ 371 (c)(1),
(2) Date: Apr. 19, 2016

(87) PCT Pub. No.: WO2015/059068
PCT Pub. Date: Apr. 30, 2015

(65) Prior Publication Data
US 2016/0264727 A1    Sep. 15, 2016

(30) Foreign Application Priority Data
Oct. 23, 2013 (EP) ....................... 1389805

(51) Int. Cl.
*C08G 64/34* (2006.01)
(52) U.S. Cl.
CPC ................... *C08G 64/34* (2013.01)
(58) Field of Classification Search
CPC ........................................................ C08G 64/34
See application file for complete search history.

(56) References Cited

U.S. PATENT DOCUMENTS

| 3,404,109 | A |   | 10/1968 | Milgrom |
| 3,829,505 | A |   | 8/1974  | Herold |
| 3,941,849 | A |   | 3/1976  | Herold |
| 4,145,525 | A | * | 3/1979  | Dixon ............. C08G 64/0208 525/410 |
| 5,158,922 | A |   | 10/1992 | Hinney et al. |
| 5,470,813 | A |   | 11/1995 | Le-Khac |
| 6,767,986 | B2 |  | 7/2004  | Moethrath et al. |
| 6,780,813 | B1 |  | 8/2004  | Hofmann et al. |
| 6,835,687 | B2 |  | 12/2004 | Hofmann et al. |
| 7,008,900 | B1 |  | 3/2006  | Hofmann et al. |
| 7,304,172 | B2 |  | 12/2007 | Coates et al. |
| 8,247,467 | B2 |  | 8/2012  | Mijolovic et al. |
| 8,324,419 | B2 |  | 12/2012 | Mijolovic et al. |
| 9,249,259 | B2 |  | 2/2016  | Müller et al. |
| 9,273,183 | B2 |  | 3/2016  | Müller et al. |
| 2012/0165549 | A1 | | 6/2012 | Ok et al. |
| 2015/0259475 | A1 | | 9/2015 | Müller et al. |
| 2016/0208080 | A1 | * | 7/2016 | Laemmerhold .... C08G 64/0258 |
| 2017/0137569 | A1 | * | 5/2017 | Hofmann ............... C08G 64/34 |

FOREIGN PATENT DOCUMENTS

| CA | 2810559 A1 * | 3/2012 |
| EP | 0 222 453 A2 | 5/1987 |
| EP | 0090445 B1 * | 10/1988 |
| EP | 0700949 A2 | 3/1996 |
| EP | 0743093 A1 | 11/1996 |
| EP | 0761708 A2 | 3/1997 |
| EP | 1359177 A1 | 11/2003 |
| EP | 1577334 A1 | 9/2005 |
| EP | 2548906 A1 | 1/2013 |
| EP | 2703425 A1 | 3/2014 |
| EP | 2703426 A1 | 3/2014 |
| JP | H04145123 A | 5/1992 |
| JP | 2005272838 | 10/2005 |
| JP | 2010516796 | 5/2010 |
| WO | WO-97/40086 A1 | 10/1997 |

(Continued)

OTHER PUBLICATIONS

International Search Report for PCT/EP2014/072389 dated Jan. 19, 2015.

*Primary Examiner* — Rabon A Sergent
(74) *Attorney, Agent, or Firm* — K&L Gates LLP

(57) ABSTRACT

The invention relates to a process for producing polyether carbonate polyols through an addition reaction of alkylene oxides and carbon dioxide onto one or more H-functional starter substances in the presence of a double metal cyanide catalyst or in the presence of a metal complex catalyst based on the metals zinc and/or cobalt, characterized in that one or more H-functional starter substances containing at least 1000 ppm of component (K) is/are continuously metered into the reactor during the reaction, where component (K) is selected from at least one compound containing a phosphorus-oxygen bond and a phosphorus compound that can form one or more P—O bonds through reaction with OH-functional compounds.

12 Claims, No Drawings

(56) References Cited

FOREIGN PATENT DOCUMENTS

| WO | WO-98/16310 A1 | 4/1998 |
| WO | WO-00/47649 A1 | 8/2000 |
| WO | WO-01/39883 A1 | 6/2001 |
| WO | WO-01/80994 A1 | 11/2001 |
| WO | WO-03/029325 A1 | 4/2003 |
| WO | WO-2008/058913 A1 | 5/2008 |
| WO | 2008092767 A1 | 8/2008 |
| WO | WO-2008092767 A1 | 8/2008 |
| WO | WO 2014/033070 A1 * | 3/2014 |

* cited by examiner

METHOD FOR PRODUCING POLYETHER CARBONATE POLYOLS

CROSS-REFERENCE TO RELATED APPLICATIONS

This application is a national stage application (under 35 U.S.C. § 371) of PCT/EP2014/072389, filed Oct. 20, 2014, which claims benefit of European Application No. 13189805.8, filed Oct. 23, 2013, both of which are incorporated herein by reference in their entirety.

The present invention relates to a process for preparing polyethercarbonate polyols by catalytic copolymerization of carbon dioxide ($CO_2$) with alkylene oxides in the presence of one or more H-functional starter substances.

BACKGROUND OF THE INVENTION

The preparation of polyethercarbonate polyols by catalytic reaction of alkylene oxides (epoxides) and carbon dioxide in the presence of H-functional starter substances ("starters") has been the subject of intensive study for more than 40 years (e.g. Inoue et al., Copolymerization of Carbon Dioxide and Epoxide with Organometallic Compounds; Die Makromolekulare Chemie 130, 210-220, 1969). This reaction is shown in schematic form in scheme (I), where R is an organic radical such as alkyl, alkylaryl or aryl, each of which may also contain heteroatoms, for example O, S, Si, etc., and where e, f and g are each integers, and where the product shown here in scheme (I) for the polyethercarbonate polyol should merely be understood in such a way that blocks having the structure shown may in principle be present in the polyethercarbonate polyol obtained, but the sequence, number and length of the blocks and the OH functionality of the starter may vary, and it is not restricted to the polyethercarbonate polyol shown in scheme (I). This reaction (see scheme (I)) is highly advantageous from an environmental standpoint since this reaction comprises converting a greenhouse gas such as $CO_2$ into a polymer. A further product, actually a by-product, formed here is the cyclic carbonate shown in scheme (I) (for example, when R=$CH_3$, propylene carbonate).

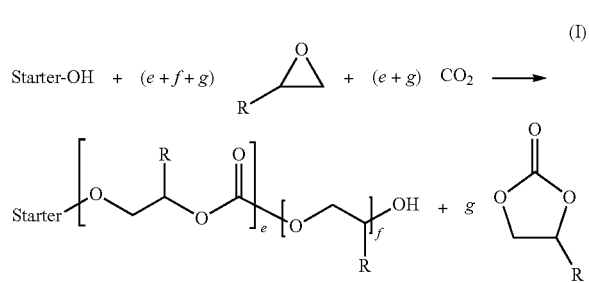

EP-A 0 222 453 discloses a process for preparing polycarbonates from alkylene oxides and carbon dioxide using a catalyst system composed of DMC catalyst and a cocatalyst such as zinc sulfate. This polymerization is initiated by one-off contacting of a portion of the alkylene oxide with the catalyst system. Only thereafter are the residual amount of alkylene oxide and the carbon dioxide added simultaneously. The amount of 60% by weight of alkylene oxide compound relative to the H-functional starter compound, as specified in EP-A 0 222 453 for the activation step in examples 1 to 7, is high and has the disadvantage that this constitutes a certain safety risk for industrial scale applications because of the high exothermicity of the homopolymerization of alkylene oxide compounds.

WO-A 2003/029325 discloses a process for preparing high molecular weight aliphatic polyethercarbonate polyols (weight-average molecular weight greater than 30 000 g/mol), in which a catalyst from the group consisting of zinc carboxylate and multimetal cyanide compound is used, this catalyst being anhydrous and first being contacted with at least a portion of the carbon dioxide before the alkylene oxide is added. Final $CO_2$ pressures of up to 150 bar place very high demands on the reactor and on safety. Even the extremely high pressure of 150 bar resulted in incorporation of only about 33% by weight of $CO_2$ up to a maximum of 42% by weight of $CO_2$. The accompanying examples describe the use of a solvent (toluene) which has to be removed again by thermal means after the reaction, thus resulting in increased time and cost demands. Furthermore, the polymers, with a polydispersity of 2.7 or more, have a very broad molar mass distribution.

WO-A 2008/092767 discloses a process for preparing polyethercarbonate polyols, characterized in that one or more H-functional starter substances are initially charged in the reactor and in that one or more H-functional starter substances are metered continuously into the reactor during the reaction. This process thus has the drawback that one or more H-functional starter substances have to be initially charged in the reactor.

European patent applications having application numbers EP12181907.2 and EP12181905.6 disclose processes for preparing polyethercarbonate polyols by addition of alkylene oxides and carbon dioxide onto one or more H-functional starter substance(s) in the presence of a double metal cyanide catalyst, characterized in that suspension media containing no H-functional groups are initially charged in a reactor and one or more H-functional starter substance(s) are metered continuously into the reactor during the reaction. EP12181907.2 additionally discloses that it is possible here to add small amounts of phosphoric acid (e.g. 90 ppm of 85% $H_3PO_4$) to the starter substance metered in continuously (e.g. glycerol).

BRIEF SUMMARY OF THE INVENTION

It was therefore an object of the present invention to provide a process for preparing polyethercarbonate polyols, wherein a favorable selectivity (i.e. low ratio of cyclic carbonate to linear polymer-bound carbonate) is achieved.

DETAILED DESCRIPTION OF THE INVENTION

It has been found that, surprisingly, the object of the invention is achieved by a process for preparing polyethercarbonate polyols from one or more H-functional starter substance(s), one or more alkylene oxide(s) and carbon dioxide in the presence of a DMC catalyst or in the presence of a metal complex catalyst based on the metals zinc and/or cobalt, characterized in that (α) optionally, a portion of the H-functional starter substance(s) and/or a suspension medium containing no H-functional groups is initially charged in a reactor, in each case optionally together with DMC catalyst, (β) optionally, a portion of alkylene oxide is added to the mixture from step (α) at temperatures of 90 to 150° C., and wherein the addition of the alkylene oxide compound is then stopped, and (γ) one or more H-functional starter substance(s) containing at least 1000 ppm, preferably 1000 ppm to 10 000 ppm, of component K are metered continuously into the reactor during the reaction, component K being selected from at least one compound containing a phosphorus-oxygen bond or a compound of phosphorus that can form one or more P—O bond(s) by reaction with OH-functional compounds.

Step (α):

Any portion of the H-functional starter substance(s) used in step (α) may contain component K, for example in an amount of at least 100 ppm, preferably of 100 to 10 000 ppm.

In the process of the invention, a portion of the H-functional starter substance(s) and/or a suspension medium containing no H-functional groups can first be initially charged in the reactor. Subsequently, the amount of DMC catalyst required for the polyaddition, which is preferably unactivated, is introduced into the reactor. The sequence of addition is not crucial. It is also possible first to introduce the DMC catalyst and then the suspension medium into the reactor. Alternatively, it is also possible first to suspend the DMC catalyst in the inert suspension medium and then to introduce the suspension into the reactor. The suspension medium provides a sufficient heat transfer area with the reactor wall or cooling elements installed in the reactor, such that the heat of reaction released can be removed very efficiently. Moreover, the suspension medium, in the event of a cooling failure, provides heat capacity, such that the temperature in this case can be kept below the breakdown temperature of the reaction mixture.

Any suspension media used in accordance with the invention do not contain any H-functional groups. Suitable suspension media are all polar aprotic, weakly polar aprotic and nonpolar aprotic solvents, none of which contain any H-functional groups. As suspension medium it is also possible to use a mixture of two or more of these suspension media. The following polar aprotic solvents are mentioned here by way of example: 4-methyl-2-oxo-1,3-dioxolane (also referred to hereinafter as cyclic propylene carbonate or cPC), 1,3-dioxolan-2-one (also referred to hereinafter as cyclic ethylene carbonate or cEC), acetone, methyl ethyl ketone, acetonitrile, nitromethane, dimethyl sulfoxide, sulfolane, dimethylformamide, dimethylacetamide and N-methylpyrrolidone. The group of the nonpolar aprotic and weakly polar aprotic solvents includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

Likewise suitable as suspension media used in accordance with the invention are aliphatic lactones, aromatic lactones, lactides, cyclic carbonates having at least three optionally substituted methylene groups between the oxygen atoms of the carbonate group, aliphatic cyclic anhydrides and aromatic cyclic anhydrides.

Aliphatic or aromatic lactones in the context of the invention are cyclic compounds containing an ester bond in the ring, preferably 4-membered lactone rings such as β-propiolactone, β-butyrolactone, β-isovalerolactone, β-caprolactone, β-isocaprolactone, β-methyl-β-valerolactone, 5-membered lactone rings such as γ-butyrolactone, γ-valerolactone, 5-methylfuran-2(3H)-one, 5-methylidenedihydrofuran-2(3H)-one, 5-hydroxyfuran-2(5H)-one, 2-benzofuran-1(3H)-one and 6-methyl-2-benzofuran-1(3H)-one, 6-membered lactone rings such as δ-valerolactone, 1,4-dioxan-2-one, dihydrocoumarin, 1H-isochromen-1-one, 8H-pyrano[3,4-b]pyridine-8-one, 1,4-dihydro-3H-isochromen-3-one, 7,8-dihydro-5H-pyrano[4,3-b]pyridine-5-one, 4-methyl-3,4-dihydro-1H-pyrano[3,4-b]pyridine-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de]isochromen-1-one, 6,7-dimethoxy-1,4-dihydro-3H-isochromen-3-one and 3-phenyl-3,4-dihydro-1H-isochromen-1-one, 7-membered lactone rings, such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, lactone rings having higher numbers of members, such as (7E)-oxacycloheptadec-7-en-2-one. Particular preference is given to ε-caprolactone and dihydrocoumarin.

Lactides in the context of the invention are cyclic compounds containing two or more ester bonds in the ring, preferably glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-hexyl-6-methyl-1,4-dioxane-2,5-diones, 3,6-di(but-3-en-1-yl)-1,4-dioxane-2,5-dione (in each case inclusive of optically active forms). Particular preference is given to L-lactide.

Cyclic carbonates having at least three optionally substituted methylene groups between the oxygen atoms of the carbonate group are preferably trimethylene carbonate, neopentyl glycol carbonate (5,5-dimethyl-1,3-dioxan-2-one), 2,2,4-trimethyl-1,3-pentanediol carbonate, 2,2-dimethylbutane-1,3-diol carbonate, butane-1,3-diol carbonate, 2-methylpropane-1,3-diol carbonate, pentane-2,4-diol carbonate, 2-methylbutane-1,3-diol carbonate, TMP monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-dioxan-2-one. Particular preference is given to trimethylene carbonate and neopentyl glycol carbonate.

Cyclic anhydrides are preferably succinic anhydride, maleic anhydride, phthalic anhydride, 1,2-cyclohexanedicarboxylic anhydride, diphenic anhydride, tetrahydrophthalic anhydride, methyltetrahydrophthalic anhydride, norbornenedioic anhydride and the chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6(3H)-dione, 1,4-dioxane-2,6-dione, 2H-pyran-2,4,6(3H,5H)-trione, 3-ethyldihydrofuran-2,5-dion, 3-methoxydihydrofuran-2,5-dione, 3-(prop-2-en-1-yl)dihydrofuran-2,5-dione, N-(2,5-dioxotetrahydrofuran-3-yl)formamide and 3[(2E)-but-2-en-1-yl]dihydrofuran-2,5-dione. Particular preference is given to succinic anhydride, maleic anhydride and phthalic anhydride.

The suspension medium used may also be a mixture of two or more of the suspension media mentioned. Most preferably, the suspension medium used in step ($\alpha$) is at least one compound selected from the group consisting of 4-methyl-2-oxo-1,3-dioxolane, 1,3-dioxolan-2-one, acetone, methyl ethyl ketone, acetonitrile, nitromethane, dimethyl sulfoxide, sulfolane, dimethylformamide, dimethylacetamide, N-methylpyrrolidone, dioxane, diethyl ether, methyl tert-butyl ether, tetrahydrofuran, ethyl acetate, butyl acetate, pentane, n-hexane, benzene, toluene, xylene, ethylbenzene, chloroform, chlorobenzene, dichlorobenzene, carbon tetrachloride, ε-caprolactone, dihydrocoumarin, trimethylene carbonate, neopentyl glycol carbonate, 3,6-dimethyl-1,4-dioxane-2,5-dione, succinic anhydride, maleic anhydride and phthalic anhydride.

In one embodiment of the invention, in step ($\alpha$), a suspension medium containing no H-functional groups is initially charged in the reactor, optionally together with DMC catalyst, and no H-functional starter substance is initially charged in the reactor at this time. Alternatively, it is also possible in step ($\alpha$) to initially charge the reactor with a suspension medium containing no H-functional groups, and additionally a portion of the H-functional starter substance(s) and optionally DMC catalyst.

The DMC catalyst is preferably used in an amount such that the amount of DMC catalyst in the resulting reaction product is 10 to 10 000 ppm, more preferably 20 to 5000 ppm, and most preferably 50 to 500 ppm.

In a preferred embodiment, inert gas (for example argon or nitrogen), an inert gas/carbon dioxide mixture or carbon dioxide is introduced into the resulting mixture (i) of a portion of the H-functional starter substance(s) and/or suspension medium and (ii) DMC catalyst at a temperature of 90° C. to 150° C., more preferably of 100° C. to 140° C., and at the same time a reduced pressure (absolute) of 10 mbar to 800 mbar, particularly preferably of 50 mbar to 200 mbar, is applied.

In an alternative preferred embodiment, the resulting mixture (i) of a portion of the H-functional starter substance(s) and/or suspension medium and (ii) DMC catalyst is contacted at least once, preferably three times, at a temperature of 90° C. to 150° C., more preferably of 100° C. to 140° C., with 1.5 bar to 10 bar (absolute), more preferably 3 bar to 6 bar (absolute), of an inert gas (for example argon or nitrogen), an inert gas/carbon dioxide mixture or carbon dioxide and then the gauge pressure is reduced in each case to about 1 bar (absolute).

The DMC catalyst can be added in solid form or as a suspension in a suspension medium or in a mixture of at least two suspension media.

In a further preferred embodiment, in step ($\alpha$),
($\alpha$-I) a portion of the H-functional starter substance(s) and/or suspension medium is initially charged and
($\alpha$-II) the temperature of the portion of the H-functional starter substance(s) and/or the suspension medium is brought to 50° C. to 200° C., preferably 80° C. to 160° C., more preferably 100° C. to 140° C., and/or the pressure in the reactor is lowered to less than 500 mbar, preferably 5 mbar to 100 mbar, optionally while passing an inert gas stream (for example of argon or nitrogen), an inert gas/carbon dioxide stream or a carbon dioxide stream through the reactor,
wherein the double metal cyanide catalyst is added to the portion of the H-functional starter substance(s) and/or suspension medium in step ($\alpha$-I) or immediately thereafter in step ($\alpha$-II), and wherein the suspension medium contains no H-functional groups.

Step ($\beta$):

Step ($\beta$) serves to activate the DMC catalyst. This step may optionally be conducted under an inert gas atmosphere, under an atmosphere of inert gas/carbon dioxide mixture or under a carbon dioxide atmosphere. Activation in the context of this invention refers to a step wherein a portion of alkylene oxide is added to the DMC catalyst suspension at temperatures of 90° C. to 150° C. and the addition of the alkylene oxide is then interrupted, a subsequent exothermic chemical reaction causing an evolution of heat to be observed which can lead to a temperature spike ("hotspot") and the conversion of alkylene oxide and optionally $CO_2$ causing a pressure drop to be observed in the reactor. The process step of activation is the period of time from the addition of the portion of alkylene oxide, optionally in the presence of $CO_2$, to the DMC catalyst until the occurrence of the evolution of heat. Optionally, the portion of the alkylene oxide can be added to the DMC catalyst in a plurality of individual steps, optionally in the presence of $CO_2$, and then the addition of the alkylene oxide can be stopped in each case. In this case, the process step of activation comprises the period from the addition of the first portion of alkylene oxide, optionally in the presence of $CO_2$, to the DMC catalyst until the occurrence of the evolution of heat after addition of the last portion of alkylene oxide. In general, the activation step may be preceded by a step for drying the DMC catalyst and optionally the H-functional starter compound at elevated temperature and/or reduced pressure, optionally with passage of an inert gas through the reaction mixture.

One or more alkylene oxides (and optionally the carbon dioxide) can in principle be metered in different ways. The commencement of the metered addition can be effected from vacuum or at a previously chosen supply pressure. The supply pressure is preferably established by introduction of an inert gas (for example nitrogen or argon) or of carbon dioxide, where the pressure (in absolute terms) is 5 mbar to 100 bar, preferably 10 mbar to 50 bar and by preference 20 mbar to 50 bar.

In a preferred embodiment, the amount of one or more alkylene oxides used in the activation in step ($\beta$) is 0.1 to 25.0% by weight, preferably 1.0 to 20.0% by weight, especially preferably 2.0 to 16.0% by weight (based on the amount of suspension medium used in step ($\alpha$)). The alkylene oxide can be added in one step or in two or more portions. Preferably, after addition of a portion of the alkylene oxide, the addition of the alkylene oxide is stopped until the occurrence of evolution of heat and only then is the next portion of alkylene oxide added. Preference is also given to a two-stage activation (step $\beta$), wherein
($\beta$1) in a first activation stage a first portion of alkylene oxide is added under inert gas atmosphere and
($\beta$2) in a second activation stage a second portion of alkylene oxide is added under carbon dioxide atmosphere.

Step ($\gamma$):

The metered addition of one or more H-functional starter substance(s) containing at least 1000 ppm of component K, one or more alkylene oxide(s) and optionally also the carbon dioxide can be effected simultaneously or sequentially (in portions); for example, it is possible to add the total amount of carbon dioxide, the amount of H-functional starter substances and/or the amount of alkylene oxides metered in step (γ) all at once or continuously. The term "continuously" used here can be defined as a mode of addition of a reactant such that a concentration of the reactant effective for the copolymerization is maintained, meaning that, for example, the metered addition can be effected with a constant metering rate, with a varying metering rate or in portions.

It is possible, during the addition of the alkylene oxide and/or the H-functional starter substances, to increase or lower the $CO_2$ pressure gradually or stepwise or to leave it constant. Preferably, the total pressure is kept constant during the reaction by metered addition of further carbon dioxide. The metered addition of one or more alkylene oxide(s) and/or the one or more H-functional starter substance(s) is effected simultaneously or sequentially with respect to the metered addition of carbon dioxide. It is possible to meter in the alkylene oxide at a constant metering rate, or to increase or lower the metering rate gradually or stepwise, or to add the alkylene oxide in portions. Preferably, the alkylene oxide is added to the reaction mixture at a constant metering rate. If a plurality of alkylene oxides are used for synthesis of the polyethercarbonate polyols, the alkylene oxides can be metered in individually or as a mixture. The metered addition of the alkylene oxides and/or of the H-functional starter substances can be effected simultaneously or sequentially, each via separate metering points (addition points), or via one or more metering points, in which case the alkylene oxides and/or the H-functional starter substances can be metered in individually or as a mixture. It is possible via the manner and/or sequence of the metered addition of the H-functional starter substances, the alkylene oxides and/or the carbon dioxide to synthesize random, alternating, block or gradient polyethercarbonate polyols.

In a preferred embodiment, in step (γ), the metered addition of the one or more H-functional starter substance(s) is ended at a juncture prior to the addition of the alkylene oxide.

Preferably, an excess of carbon dioxide is used, based on the calculated amount of carbon dioxide incorporated in the polyethercarbonate polyol, since an excess of carbon dioxide is advantageous because of the low reactivity of carbon dioxide. The amount of carbon dioxide can be fixed via the total pressure under the respective reaction conditions. An advantageous total pressure (in absolute terms) for the copolymerization for preparation of the polyethercarbonate polyols has been found to be in the range from 0.01 to 120 bar, preferably 0.1 to 110 bar, particularly preferably from 1 to 100 bar. It is possible to feed in the carbon dioxide continuously or discontinuously. This depends on how quickly the alkylene oxides are consumed and whether the product is supposed to contain any $CO_2$-free polyether blocks. The amount of the carbon dioxide (reported as pressure) can likewise vary in the course of addition of the alkylene oxides. $CO_2$ can also be added to the reactor in solid form and then be converted under the selected reaction conditions to the gaseous, dissolved, liquid and/or supercritical state.

One characteristic feature of a preferred embodiment of the process of the invention is that, in step (γ), the total amount of the one or more H-functional starter substance(s) is added. This addition can be effected at a constant metering rate, at a varying metering rate or in portions.

For the process of the invention, it has additionally been found that the copolymerization (step (γ)) for preparation of the polyethercarbonate polyols is conducted advantageously at 50° C. to 150° C., preferably at 60° C. to 145° C., more preferably at 70° C. to 140° C. and most preferably at 90° C. to 130° C. If temperatures below 50° C. are set, the reaction generally becomes very slow. At temperatures above 150° C., there is a sharp rise in the quantity of unwanted by-products.

The metered addition of the alkylene oxide, the H-functional starter compound and the DMC catalyst can be effected via separate or combined metering points. In a preferred embodiment, the alkylene oxide and the H-functional starter compound are metered continuously into the reaction mixture via separate metering points. This addition of the one or more H-functional starter substance(s) can be effected as a continuous metered addition into the reactor or in portions.

Steps (α), (β) and (γ) can be performed in the same reactor, or each can be performed separately in different reactors. Particularly preferred reactor types are: tubular reactors, stirred tanks, loop reactors.

Polyethercarbonate polyols can be prepared in a stirred tank, in which case the stirred tank, according to the design and mode of operation, is cooled via the reactor shell, internal cooling surfaces and/or cooling surfaces within a pumped circulation system. Both in semi-batchwise application, in which the product is not removed until after the end of the reaction, and in continuous application, in which the product is removed continuously, particular attention should be paid to the metering rate of the alkylene oxide. This should be set such that, in spite of the inhibiting action of the carbon dioxide, the alkylene oxides are depleted quickly enough. The concentration of free alkylene oxides in the reaction mixture during the activation step (step (β)) is preferably >0 to 100% by weight, especially preferably >0 to 50% by weight, most preferably >0 to 20% by weight (based in each case on the weight of the reaction mixture). The concentration of free alkylene oxides in the reaction mixture during the reaction (step γ) is preferably >0%/o to 40% by weight, more preferably >0% to 25% by weight, most preferably >0% to 15% by weight (based in each case on the weight of the reaction mixture).

In a preferred embodiment, the mixture comprising the activated DMC catalyst that results from steps (α) and (β) is reacted further in the same reactor with one or more alkylene oxide(s), one or more starter substance(s) and carbon dioxide. In a further preferred embodiment, the mixture comprising the activated DMC catalyst that results from steps (α) and (β) is reacted further with alkylene oxides, one or more starter substance(s) and carbon dioxide in another reaction vessel (for example a stirred tank, tubular reactor or loop reactor).

In the case of a reaction conducted in a tubular reactor, the mixture comprising the activated DMC catalyst that results from steps (α) and (β), one or more H-functional starter substance(s), one or more alkylene oxide(s) and carbon dioxide are pumped continuously through a tube. The molar ratios of the co-reactants vary according to the desired polymer. In a preferred embodiment, carbon dioxide is metered in here in its liquid or supercritical form, in order to enable optimal miscibility of the components. Advantageously, mixing elements for better mixing of the co-reactants are installed, as sold, for example, by Ehrfeld Mikrotechnik BTS GmbH, or mixer-heat exchanger elements which simultaneously improve the mixing and heat removal.

Loop reactors can likewise be used for preparation of polyethercarbonate polyols. These generally include reactors having recycling of matter, for example a jet loop reactor, which can also be operated continuously, or a tubular reactor designed in the form of a loop with suitable apparatuses for the circulation of the reaction mixture, or a loop of several series-connected tubular reactors. The use of a loop reactor is advantageous especially because backmixing can be achieved here, such that it is possible to keep the concentration of free alkylene oxides in the reaction mixture within the optimal range, preferably in the range from >0% to 40% by weight, more preferably >0% to 25% by weight, most preferably >0% to 15% by weight (based in each case on the weight of the reaction mixture).

Preferably, the polyethercarbonate polyols are prepared in a continuous process which comprises both a continuous copolymerization and a continuous addition of the one or more H-functional starter substance(s).

The invention therefore also provides a process wherein, in step ($\gamma$), one or more H-functional starter substance(s) containing at least 1000 ppm of component K, one or more alkylene oxide(s) and DMC catalyst are metered continuously into the reactor in the presence of carbon dioxide ("copolymerization"), and wherein the resulting reaction mixture (comprising the reaction product) is removed continuously from the reactor. In this case, in step ($\gamma$), the DMC catalyst is preferably added continuously in suspension in H-functional starter compound.

For example, for the continuous process for preparing the polyethercarbonate polyols in steps ($\alpha$) and ($\beta$), an activated DMC catalyst-containing mixture is prepared, then, in step ($\gamma$), ($\gamma$1) a portion each of one or more H-functional starter substance(s), one or more alkylene oxide(s) and carbon dioxide are metered in to initiate the copolymerization, and ($\gamma$2) during the progress of the copolymerization, the remaining amount of each of DMC catalyst, one or more starter substance(s) and alkylene oxide(s) is metered in continuously in the presence of carbon dioxide, with simultaneous continuous removal of resulting reaction mixture from the reactor.

In step ($\gamma$), the DMC catalyst is preferably added suspended in the H-functional starter compound, the amount preferably being chosen such that the content of DMC catalyst in the resulting reaction product is 10 to 10 000 ppm, more preferably 20 to 5000 ppm, and most preferably 50 to 500 ppm.

Preferably, steps ($\alpha$) and ($\beta$) are conducted in a first reactor, and the resulting reaction mixture is then transferred into a second reactor for the copolymerization in step ($\gamma$). However, it is also possible to conduct steps ($\alpha$), ($\beta$) and ($\gamma$) in one reactor.

It has also been found that the process of the present invention can be used for preparation of large amounts of the polyethercarbonate polyol product, in which case a DMC catalyst activated according to steps ($\alpha$) and ($\beta$) in a portion of the H-functional starter substance(s) and/or in suspension medium is initially used, and the DMC catalyst is added without prior activation during the copolymerization ($\gamma$).

A particularly advantageous feature of the preferred embodiment of the present invention is thus the ability to use "fresh" DMC catalysts without activation of the portion of DMC catalyst which is added continuously in step ($\gamma$). An activation of DMC catalysts to be conducted analogously to step ($\beta$) does not just involve additional attention from the operator, which results in an increase in the manufacturing costs, but also requires a pressurized reaction vessel, which also results in an increase in the capital costs in the construction of a corresponding production plant. Here, "fresh" catalyst is defined as unactivated DMC catalyst in solid form or in the form of a slurry in a starter substance or suspension medium. The ability of the present process to use fresh unactivated DMC catalyst in step ($\gamma$) enables significant savings in the commercial preparation of polyethercarbonate polyols and is a preferred embodiment of the present invention.

The term "continuously" used here can be defined as the mode of addition of a relevant catalyst or reactant such that an essentially continuous effective concentration of the DMC catalyst or the reactant is maintained. The catalyst can be fed in in a truly continuous manner or in relatively closely spaced increments. Equally, a continuous addition of starter can be effected in a truly continuous manner or in increments. There would be no departure from the present process in adding a DMC catalyst or reactants incrementally such that the concentration of the materials added drops essentially to zero for a period of time before the next incremental addition. However, it is preferable for the DMC catalyst concentration to be kept substantially at the same concentration during the main portion of the course of the continuous reaction, and for starter substance to be present during the main portion of the copolymerization process. An incremental addition of DMC catalyst and/or reactant which essentially does not affect the nature of the product is nevertheless "continuous" in that sense in which the term is being used here. One feasible option is, for example, to provide a recycling loop in which a portion of the reacting mixture is recycled to a prior point in the process, as a result of which discontinuities brought about by incremental additions are smoothed out.

Step ($\delta$)

In an optional step ($\delta$) the reaction mixture continuously removed in step ($\gamma$) which generally has an alkylene oxide content of from 0.05% by weight to 10% by weight may be transferred into a postreactor in which, by way of a postreaction, the content of free alkylene oxide is reduced to less than 0.05% by weight in the reaction mixture. The postreactor may be a tubular reactor, a loop reactor or a stirred tank for example.

The pressure in this postreactor is preferably at the same pressure as in the reaction apparatus in which reaction step ($\gamma$) is performed. The pressure in the downstream reactor can, however, also be selected at a higher or lower level. In a further preferred embodiment, the carbon dioxide, after reaction step ($\gamma$), is fully or partly released and the downstream reactor is operated at standard pressure or a slightly elevated pressure. The temperature in the downstream reactor is preferably 50° C. to 150° C. and more preferably 80° C. to 140° C.

The polyethercarbonate polyols obtained in accordance with the invention have a functionality of, for example, at least 1, preferably of 1 to 8, particularly preferably of 1 to 6 and very particularly preferably of 2 to 4. The molecular weight is preferably 400 to 10 000 g/mol and particularly preferably 500 to 6000 g/mol.

Alkylene Oxides

In general, for the process of the invention, it is possible to use alkylene oxides (epoxides) having 2-24 carbon atoms. The alkylene oxides having 2-24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkoxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Preferably, the alkylene oxides used are ethylene oxide and/or propylene oxide, especially propylene oxide.

Component K

Compounds suitable as component K are characterized in that they contain at least one phosphorus-oxygen bond. Examples of suitable components K are phosphoric acid and phosphoric salts, phosphoryl halides, phosphoramides, phosphoric esters and salts of the mono- and diesters of phosphoric acid.

In the context of the invention the esters cited as possible components K hereinabove and hereinbelow are to be understood as meaning in each case the alkyl ester, aryl ester and/or alkaryl ester derivatives.

Examples of suitable phosphoric esters include mono-, di- or triesters of phosphoric acid, mono-, di-, tri- or tetraesters of pyrophosphoric acid and mono-, di-, tri-, tetra- or polyesters of polyphosphoric acid with alcohols having 1 to 30 carbon atoms. Examples of compounds suitable as component K include: triethyl phosphate, diethyl phosphate, monoethyl phosphate, tripropyl phosphate, dipropyl phosphate, monopropyl phosphate, tributyl phosphate, dibutyl phosphate, monobutyl phosphate, trioctyl phosphate, tris(2-ethylhexyl) phosphate, tris(2-butoxyethyl) phosphate, diphenyl phosphate, dicresyl phosphate, fructose 1,6-biphosphate, glucose 1-phosphate, bis(dimethylamido)phosphoric chloride, bis(4-nitrophenyl) phosphate, cyclopropylmethyl diethyl phosphate, dibenzyl phosphate, diethyl 3-butenyl phosphate, dihexadecyl phosphate, diisopropyl chlorophosphate, diphenyl phosphate, diphenyl chlorophosphate, 2-hydroxyethyl methacrylate phosphate, mono(4-chlorophenyl) dichlorophosphate, mono(4-nitrophenyl) dichlorophosphate, monophenyl dichlorophosphate, tridecyl phosphate, tricresyl phosphate, trimethyl phosphate, triphenyl phosphate, phosphoric acid tripyrolidide, phosphorus sulfochloride, dimethylamidophosphoric dichloride, methyl dichlorophosphate, phosphoryl bromide, phosphoryl chloride, phosphoryl quinoline chloride calcium salt and O-phosphorylethanolamine, alkali metal and ammonium dihydrogenphosphates, alkali metal, alkaline earth metal and ammonium hydrogenphosphates, alkali metal, alkaline earth metal and ammonium phosphates.

The term "esters of phosphoric acid" (phosphoric esters) is understood also to include the products obtainable by propoxylation of phosphoric acid (available as Exolit® OP 560 for example).

Other suitable components K are phosphonic acid and phosphorous acid and also mono- and diesters of phosphonic acid and mono-, di- and triesters of phosphorous acid and their respective salts, halides and amides.

Examples of suitable phosphonic esters include mono- or diesters of phosphonic acid, alkylphosphonic acids, arylphosphonic acids, alkoxycarbonylalkylphosphonic acids, alkoxycarbonylphosphonic acids, cyanoalkylphosphonic acids and cyanophosphonic acids or mono-, di-, tri- or tetraesters of alkyldiphosphonic acids with alcohols having 1 to 30 carbon atoms. Examples of suitable phosphorous esters include mono-, di- or triesters of phosphorous acid with alcohols having 1 to 30 carbon atoms. This includes, for example, phenylphosphonic acid, butylphosphonic acid, dodecylphosphonic acid, ethylhexylphosphonic acid, octylphosphonic acid, ethylphosphonic acid, methylphosphonic acid, octadecylphosphonic acid and the mono- and dimethyl, -ethyl, -butyl, -ethylhexyl or -phenyl esters thereof, dibutyl butylphosphonate, dioctyl phenylphosphonate, triethyl phosphonoformate, trimethyl phosphonoacetate, triethyl phosphonoacetate, trimethyl 2-phosphonopropionate, triethyl 2-phosphonopropionate, tripropyl 2-phosphonopropionate, tributyl 2-phosphonopropionate, triethyl 3-phosphonopropionate, triethyl 2-phosphonobutyrate, triethyl 4-phosphonocrotonate, (12-phosphonododecyl)phosphonic acid, phosphonoacetic acid, methyl P,P-bis(2,2,2-trifluoroethyl)phosphonoacetate, trimethylsilyl P,P-diethylphosphonoacetate, tert-butyl P,P-dimethylphosphonoacetate, dimethyl P,P-phosphonoacetate potassium salt, ethyl P,P-dimethylphosphonoacctate, 16-phosphonohexadecanoic acid, 6-phosphonohexanoic acid, N-(phosphonomethyl)glycine, N-(phosphonomethyl) glycine monoisopropylamine salt, N-(phosphonomethyl) iminodiacetic acid, (8-phosphonooctyl)phosphonic acid, 3-phosphonopropionic acid, 11-phosphonoundecanoic acid, pinacol phosphonate, trilauryl phosphite, tris(3-ethyloxethanyl-3-methyl) phosphite, heptakis(dipropylene glycol) phosphite, 2-cyanoethyl N,N-diisopropylphosphoramidate, methyl N,N-diisopropylphosphoramidate, dibutyl phosphite, dibenzyl N,N-diethylphosphoramidate, di-tert-butyl N,N-diethylphosphoramidate, diethyl phosphite, diallyl N,N-diisopropylphosphoramidate, dibenzyl N,N-diisopropylphosphoramidate, di-tert-butyl N,N-diisopropylphosphoramidate, dimethyl N,N-diisopropylphosphoramidate, dibenzyl N,N-dimethylphosphoramidate, dimethyl phosphite, dimethyl trimethylsilyl phosphite, diphenyl phosphite, methyl dichlorophosphate, 2-cyanoethyl N,N-diisopropylchlorophosphoramidate, o-phenylene phosphochloridate, tributyl phosphite, triethyl phosphite, triisopropyl phosphite, triphenyl phosphite, tris(tert-butyldimethylsilyl) phosphite, tris(1,1,1,3,3,3-hexafluoro-2-propyl) phosphite, tris(trimethylsilyl) phosphite, dibenzyl phosphite. The term "esters of phosphorous acid" is also understood to include the products obtainable by propoxylation of phosphorous acid (available as Exolit® OP 550 for example).

Other suitable components K are phosphinic acid, phosphonous acid and phosphinous acid and their respective esters. Examples of suitable phosphinic esters include esters of phosphinic acid, alkylphosphinic acids, dialkylphosphinic acids or arylphosphinic acids with alcohols having 1 to 30 carbon atoms. Examples of suitable phosphonous esters include mono- and diesters of phosphonous acid or arylphosphonous acid with alcohols having 1 to 30 carbon atoms. This includes, for example, diphenylphosphinic acid or 9,10-dihydro-9-oxa-10-phosphaphenanthrene 10-oxide.

The esters of phosphoric acid, phosphonic acid, phosphorous acid, phosphinic acid, phosphonous acid or phosphinous acid suitable as component K are generally obtained by reaction of phosphoric acid, pyrophosphoric acid, polyphosphoric acid, phosphonic acid, alkylphosphonic acids, arylphosphonic acids, alkoxycarbonylalkylphosphonic acids, alkoxycarbonylphosphonic acids, cyanoalkylphosphonic acids, cyanophosphonic acid, alkyldiphosphonic acids, phosphonous acid, phosphorous acid, phosphinic acid, phosphinous acid or the halogen derivatives or phosphorus oxides thereof with hydroxyl compounds having 1 to 30 carbon atoms, such as methanol, ethanol, propanol, butanol, pentanol, hexanol, heptanol, octanol, nonanol, decanol, dodecanol, tridecanol, tetradecanol, pentadecanol, hexadecanol, heptadecanol, octadecanol, nonadecanol, methoxymethanol, ethoxymethanol, propoxymethanol, butoxymethanol, 2-ethoxyethanol, 2-propoxyethanol, 2-butoxyethanol, phenol, ethyl hydroxyacetate, propyl hydroxyacetate, ethyl hydroxypropionate, propyl hydroxypropionate, ethane-1,2-diol, propane-1,2-diol, 1,2,3-trihydroxypropane, 1,1,1-trimethylolpropane or pentaerythritol.

Phosphine oxides suitable as component K contain one or more alkyl, aryl or aralkyl groups having 1-30 carbon atoms bonded to the phosphorus. Preferred phosphine oxides have the general formula $R_3P=O$ where R is an alkyl, aryl or aralkyl group having 1-20 carbon atoms. Examples of suitable phosphine oxides include trimethylphosphine oxide, tri(n-butyl)phosphine oxide, tri(n-octyl)phosphine oxide, triphenylphosphine oxide, methyldibenzylphosphine oxide and mixtures thereof.

Also suitable as component K are compounds of phosphorus that can form one or more P—O bond(s) by reaction with OH-functional compounds (such as water or alcohols for example). Examples of such compounds of phosphorus that are useful include phosphorus(V) sulfide, phosphorus tribromide, phosphorus trichloride and phosphorus triiodide.

It is also possible to employ any desired mixtures of the abovementioned compounds as component K.

In one embodiment of the invention, component K is selected from at least one compound from the group consisting of phosphoric acid, phosphonic acid, phosphorous acid, phosphinic acid, phosphonous acid, phosphinous acid, phosphine oxides, and salts, esters, halides and amides of phosphoric acid, phosphonic acid, phosphorous acid, phosphinic acid, phosphonous acid and phosphinous acid, phosphorus(V) sulfide, phosphorus tribromide, phosphorus trichloride and phosphorus triiodide.

Preferably, component K is selected from at least one compound from the group consisting of phosphoric acid,
mono-, di- or trialkyl esters of phosphoric acid,
mono-, di- or triaryl esters of phosphoric acid,
mono-, di- or trialkaryl esters of phosphoric acid,
$(NH_4)_2HPO_4$,
phosphonic acid,
mono- or dialkyl esters of phosphonic acid,
mono- or diaryl esters of phosphonic acid,
mono- or dialkaryl esters of phosphonic acid,
phosphorous acid,
mono-, di- or trialkyl esters of phosphorous acid,
mono-, di- or triaryl esters of phosphorous acid,
mono-, di- or trialkaryl esters of phosphorous acid,
phosphinic acid,
phosphonous acid and
phosphinous acid.

More preferably, component K is phosphoric acid.

H-Functional Starter Substance

Suitable H-functional starter substances ("starters") used may be compounds having alkoxylation-active hydrogen atoms and having a molar mass of 18 to 4500 g/mol, preferably of 62 to 500 g/mol and more preferably of 62 to 182 g/mol. The ability to use a starter having a low molar mass is a distinct advantage over the use of oligomeric starters prepared by means of a prior alkoxylation. In particular, a level of economic viability is achieved that is made possible by the omission of a separate alkoxylation process.

Groups active in respect of the alkoxylation and having active hydrogen atoms are, for example, —OH, —NH$_2$ (primary amines), —NH— (secondary amines), —SH, and —CO$_2$H, preferably —OH and —NH$_2$, more preferably —OH. H-Functional starter substances used are, for example, one or more compounds selected from the group consisting of mono- and polyhydric alcohols, polyfunctional amines, polyfunctional thiols, amino alcohols, thio alcohols, hydroxy esters, polyether polyols, polyester polyols, polyester ether polyols, polyethercarbonate polyols, polycarbonate polyols, polycarbonates, polyethyleneimines, polyetheramines, polytetrahydrofurans (e.g. PolyTHF® from BASF), polytetrahydrofuran amines, polyether thiols, polyacrylate polyols, castor oil, the mono- or diglyceride of ricinoleic acid, monoglycerides of fatty acids, chemically modified mono-, di- and/or triglycerides of fatty acids, and $C_1$-$C_{24}$ alkyl fatty acid esters containing an average of at least 2 OH groups per molecule. By way of example, the $C_1$-$C_{24}$ alkyl fatty acid esters containing an average of at least 2 OH groups per molecule are commercial products such as Lupranol Balance® (from BASF AG), Merginol® products (from Hobum Oleochemicals GmbH), Sovermol® products (from Cognis Deutschland GmbH & Co. KG) and Soyol®™ products (from USSC Co.).

Monofunctional starter substances used may be alcohols, amines, thiols and carboxylic acids. Monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, tert-butylamine, pentylamine, hexylamine, aniline, aziridine, pyrrolidine, piperidine, morpholine. Monofunctional thiols used may be: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (for example ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (for example 3-methyl-1,5-pentanediol), 1,6-hexanediol, 1,8-octanediol, 1,10-decanediol, 1,12-dodecanediol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, especially castor oil), and all the modification products of these aforementioned alcohols with different amounts of ε-caprolactone.

The H-functional starter substances may also be selected from the substance class of the polyether polyols having a molecular weight $M_a$ in the range from 18 to 4500 g/mol and a functionality of 2 to 3. Preference is given to polyether polyols formed from repeat ethylene oxide and propylene oxide units, preferably having a proportion of propylene oxide units of 35% to 100%, particularly preferably having a proportion of propylene oxide units of 50% to 100%. These may be random copolymers, gradient copolymers, alternating copolymers or block copolymers of ethylene oxide and propylene oxide.

The H-functional starter substances may also be selected from the substance class of the polyester polyols. The polyester polyols used are at least difunctional polyesters. Preferably, polyester polyols consist of alternating acid and alcohol units. Acid components used are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. Alcohol components used are, for example, ethanediol, propane-1,2-diol, propane-1,3-diol, butane-1,4-diol, pentane-1,5-diol, neopentyl glycol, hexane-1,6-diol, 1,4-bis(hydroxymethyl)cyclohexane, diethylene glycol, dipropylene glycol, trimethylolpropane, glycerol, pentaerythritol or mixtures of the alcohols mentioned. Employing dihydric or polyhydric polyether polyols as the alcohol component affords polyester ether polyols which can likewise serve as starter substances for preparation of the polyethercarbonate polyols.

In addition, H-functional starter substances used may be polycarbonate diols which are prepared, for example, by reaction of phosgene, dimethyl carbonate, diethyl carbonate or diphenyl carbonate and difunctional alcohols or polyester polyols or polyether polyols. Examples of polycarbonates may be found, for example, in EP-A 1359177.

In a further embodiment of the invention, it is possible to use polyethercarbonate polyols as H-functional starter substances. More particularly, polyethercarbonate polyols obtainable by the process of the invention described here are used. For this purpose, these polyethercarbonate polyols used as H-functional starter substances are prepared in a separate reaction step beforehand.

The H-functional starter substances generally have a functionality (i.e. the number of hydrogen atoms active in respect of the polymerization per molecule) of 1 to 8, preferably of 2 or 3. The H-functional starter substances are used either individually or as a mixture of at least two H-functional starter substances.

More preferably, the H-functional starter substances are one or more compounds selected from the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane, pentaerythritol, sorbitol, polyethercarbonate polyols having a molecular weight Mn in the range from 150 to 8000 g/mol with a functionality of 2 to 3 and polyether polyols having a molecular weight Mn in the range from 150 to 8000 g/mol and a functionality of 2 to 3.

The polyethercarbonate polyols are prepared by catalytic addition of carbon dioxide and alkylene oxides onto H-functional starter substances. In the context of the invention, "H-functional" is understood to mean the number of alkoxylation-active hydrogen atoms per molecule of the starter substance.

According to the invention, the one or more H-functional starter substance(s) metered continuously into the reactor during the reaction contain(s) at least 1000 ppm, preferably 1000 ppm to 10 000 ppm, of component K.

DMC Catalysts

DMC catalysts for use in the homopolymerization of alkylene oxides are known in principle from the prior art (see, for example, U.S. Pat. No. 3,404,109, U.S. Pat. No. 3,829,505, U.S. Pat. No. 3,941,849 and U.S. Pat. No. 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity and enable the preparation of polyethercarbonate polyols at very low catalyst concentrations, such that a removal of the catalyst from the finished product is generally not required. A typical example is that of the highly active DMC catalysts which are described in EP-A 700 949 and contain not only a double metal cyanide compound (e.g. zinc hexacyanocobaltate(III)) and an organic complex ligand (e.g. tert-butanol) but also a polyether having a number-average molecular weight greater than 500 g/mol.

The DMC catalysts are preferably obtained by (i) reacting an aqueous solution of a metal salt with the aqueous solution of a metal cyanide salt in the presence of one or more organic complex ligands, e.g. an ether or alcohol, in a first step, (ii) removing the solid from the suspension obtained from (i) by known techniques (such as centrifugation or filtration) in a second step, (iii) optionally washing the isolated solid with an aqueous solution of an organic complex ligand (for example by resuspending and subsequent reisolating by filtration or centrifugation) in a third step, (iv) and subsequently drying the solid obtained at temperatures of in general 20-120° C. and at pressures of in general 0.1 mbar to atmospheric pressure (1013 mbar), optionally after pulverizing, wherein in the first step or immediately after the precipitation of the double metal cyanide compound (second step) one or more organic complex ligands, preferably in excess (based on the double metal cyanide compound), and optionally further complex-forming components are added.

The double metal cyanide compounds present in the DMC catalysts are the reaction products of water-soluble metal salts and water-soluble metal cyanide salts.

For example, an aqueous solution of zinc chloride (preferably in excess based on the metal cyanide salt, for example potassium hexacyanocobaltate) and potassium hexacyanocobaltate are mixed and dimethoxyethane (glyme) or tert-butanol (preferably in excess based on zinc hexacyanocobaltate) is then added to the suspension formed.

Metal salts suitable for preparation of the double metal cyanide compounds preferably have the general formula (II)

$$M(X)_n \hspace{2cm} (II)$$

where

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

n is 1 when X=sulfate, carbonate or oxalate and n is 2 when X=halide, hydroxide, carboxylate, cyanate, thiocyanate, isocyanate, isothiocyanate or nitrate, or suitable metal salts have the general formula (III)

$$M_r(X)_3 \qquad (III)$$

where

M is selected from the metal cations $Fe^{3+}$, $Al^{3+}$, $Co^{3+}$ and $Cr^{3+}$, X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalate and r is 1 when X=halide, hydroxide, carboxylate, cyanate, thiocyanate, isocyanate, isothiocyanate or nitrate, or suitable metal salts have the general formula (IV)

$$M(X)_s \qquad (IV)$$

where

M is selected from the metal cations $Mo^{4+}$, $V^{4+}$ and $W^{4+}$,

X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

s is 2 when X=sulfate, carbonate or oxalate and s is 4 when X=halide, hydroxide, carboxylate, cyanate, thiocyanate, isocyanate, isothiocyanate or nitrate, or suitable metal salts have the general formula (V)

$$M(X)_t \qquad (V)$$

where

M is selected from the metal cations $Mo^{6+}$ and $W^{6+}$,

X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

t is 3 when X=sulfate, carbonate or oxalate and t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(III) bromide, iron(I) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (VI)

$$(Y)_a M'(CN)_b (A)_c \qquad (VI)$$

where

M' is selected from one or more metal cations from the group consisting of Fe(II), Fe(III), Co(II), Co(II), Cr(II), Cr(II), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate and nitrate, and a, b and c are integers, the values for a, b and c being selected such as to ensure the electronic neutrality of the metal cyanide salt; a is preferably 1, 2, 3 or 4; b is preferably 4, 5 or 6; c preferably has the value 0.

Examples of suitable metal cyanide salts are sodium hexacyanocobaltate(II), potassium hexacyanocobaltate(II), potassium hexacyanoferrate(II), potassium hexacyanoferrate(III), calcium hexacyanocobaltate(III) and lithium hexacyanocobaltate(III).

Preferred double metal cyanide compounds present in the DMC catalysts are compounds of general formula (VII)

$$M_x[M'_{x'}(CN)_y]_z \qquad (VII)$$

where M is as defined in formula (I) to (V) and

M' is as defined in formula (VI), and x, x', y and z are integers and are chosen so as to ensure electronic neutrality of the double metal cyanide compound.

Preferably, x=3, x'=, y=6 and z=2,

M=Zn(II), Fe(II), Co(II) or Ni(II) and

M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S. Pat. No. 3,404,109, U.S. Pat. No. 3,829,505, U.S. Pat. No. 3,941,849, EP-A 700 949, EP-A 761 708, JP 4 145 123, U.S. Pat. No. 5,470,813, EP-A 743 093 and WO-A 97/40086). The organic complex ligands used are, for example, water-soluble organic compounds containing heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds containing both aliphatic or cycloaliphatic ether groups and aliphatic hydroxyl groups (for example ethylene glycol mono-tert-butyl ether, diethylene glycol mono-tert-butyl ether, tripropylene glycol monomethyl ether and 3-methyl-3-oxetanemethanol). The organic complex ligands given greatest preference are selected from one or more compounds of the group consisting of dimethoxyethane, tert-butanol 2-methyl-3-buten-2-ol, 2-methyl-3-butyn-2-ol, ethylene glycol mono-tert-butyl ether and 3-methyl-3-oxetanemethanol.

The preparation of the DMC catalysts optionally employs one or more complex-forming component(s) from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, gallic acids or salts, esters or amides thereof, cyclodextrins, phosphorus compounds, α,β-unsaturated carboxylic esters or ionic surface- or interface-active compounds.

The first step of the preparation of the DMC catalysts preferably comprises converting the aqueous solutions of the metal salt (e.g. zinc chloride), used in a stoichiometric excess (at least 50 mol %) based on metal cyanide salt (i.e. at least a molar ratio of metal salt to metal cyanide salt of 2.25:1.00), and of the metal cyanide salt (e.g. potassium hexacyanocobaltate) in the presence of the organic complex ligand (e.g. tert-butanol) to form a suspension comprising the double metal cyanide compound (e.g. zinc hexacyanocobaltate), water, excess metal salt, and the organic complex ligand.

This organic complex ligand may be present in the aqueous solution of the metal salt and/or of the metal cyanide salt, or it is added directly to the suspension obtained after precipitation of the double metal cyanide compound. It has proven advantageous to mix the metal salt and metal cyanide salt aqueous solutions and the organic complex ligand by stirring vigorously. Optionally, the suspension formed in the first step is subsequently treated with a further complex-forming component. The complex-forming component is preferably used in a mixture with water and organic complex ligand. A preferred process for performing the first step (i.e. the preparation of the suspension) comprises using a mixing nozzle, particularly preferably using a jet disperser, as described in WO-A 01/39883.

In the second step, the solid (i.e. the precursor of the catalyst) is isolated from the suspension by known techniques, such as centrifugation or filtration.

In a preferred execution variant, the isolated solid is subsequently washed in a third process step with an aqueous solution of the organic complex ligand (for example by resuspension and subsequent reisolation by filtration or centrifugation). In this way, it is possible to remove, for example, water-soluble by-products such as potassium chloride from the catalyst. Preferably, the amount of the organic complex ligand in the aqueous wash solution is between 40% and 80% by weight, based on the overall solution.

Further complex-forming component is optionally added to the aqueous wash solution in the third step, preferably in the range between 0.5% and 5% by weight, based on the overall solution.

It is moreover advantageous to wash the isolated solid more than once. Preferably, in a first wash step (iii-1), an aqueous solution of the organic complex ligand is used for washing (for example by resuspension and subsequent reisolation by filtration or centrifugation), in order to remove, for example, water-soluble by-products such as potassium chloride from the catalyst in this way. Especially preferably, the amount of the organic complex ligand in the aqueous wash solution is between 40 and 80% by weight, based on the overall solution in the first wash step. In the further wash steps (iii-2), either the first wash step is repeated once or more than once, preferably once to three times, or, preferably, a nonaqueous solution, for example a mixture or solution of organic complex ligand and further complex-forming component (preferably in the range between 0.5 and 5% by weight, based on the total amount of the wash solution in step (iii-2)), is used as a wash solution to wash the solid once or more than once, preferably once to three times.

The isolated and possibly washed solid is subsequently dried at temperatures of in general 20-100° C. and at pressures of in general 0.1 mbar to atmospheric pressure (1013 mbar), optionally after pulverizing.

A preferred process for isolating the DMC catalysts from the suspension by filtration, filtercake washing and drying is described in WO-A 01/80994.

In addition to the DMC catalysts based on zinc hexacyanocobaltate ($Zn_3[Co(CN)_6]_2$) that are used with preference, it is also possible to use other metal complex catalysts based on the metals zinc and/or cobalt and known to those skilled in the art from the prior art for copolymerization of epoxides and carbon dioxide for the process of the invention. This includes in particular what are called zinc glutarate catalysts (described, for example, in M. H. Chisholm et al., Macromolecules 2002, 35, 6494), what are called zinc diiminate catalysts (described, for example, in S. D. Allen, J. Am. Chem. Soc. 2002, 124, 14284) and what are called cobalt salen catalysts (described, for example, in U.S. Pat. No. 7,304,172 B2, US 2012/0165549 A1).

The polyethercarbonate polyols obtainable by the process of the invention have a low content of by-products and can be processed without difficulty, especially by reaction with di- and/or polyisocyanates to afford polyurethanes, in particular flexible polyurethane foams. For polyurethane applications, it is preferable to use polyethercarbonate polyols based on an H-functional starter substance having a functionality of at least 2. In addition, the polyethercarbonate polyols obtainable by the process of the invention can be used in applications such as washing and cleaning composition formulations, drilling fluids, fuel additives, ionic and nonionic surfactants, lubricants, process chemicals for papermaking or textile manufacture, or cosmetic formulations. The person skilled in the art is aware that, depending on the respective field of use, the polyethercarbonate polyols to be used have to fulfill certain material properties, for example molecular weight, viscosity, functionality and/or hydroxyl number.

EXAMPLES

Feedstocks:

The DMC catalyst used in all the examples was DMC catalyst prepared according to example 6 in WO 01/80994 A1.

The fraction of incorporated $CO_2$ in the resulting polyethercarbonate polyol ("$CO_2$ incorporated") and the ratio of propylene carbonate to polyethercarbonate polyol were determined by $^1$H NMR (Bruker DPX 400, 400 MHz; pulse program zg30, relaxation delay dl: 10 s, 64 scans). Each sample was dissolved in deuterated chloroform. The relevant resonances in the $^1$H NMR (based on TMS=0 ppm) are as follows:

cyclic carbonate (which was formed as a by-product) resonance at 4.5 ppm, carbonate resulting from carbon dioxide incorporated in the polyethercarbonate polyol (resonances at 5.1 to 4.8 ppm), unreacted PO with resonance at 2.4 ppm, polyether polyol (i.e. without incorporated carbon dioxide) having resonances at 1.2 to 1.0 ppm.

The mole fraction of the carbonate incorporated in the polymer in the reaction mixture is calculated by formula (X) as follows, using the following abbreviations:

A(4.5)=area of the resonance at 4.5 ppm for cyclic carbonate (corresponds to a hydrogen atom)

A(5.1-4.8)=area of the resonance at 5.1-4.8 ppm for polyethercarbonate polyol and a hydrogen atom for cyclic carbonate A(2.4)=area of the resonance at 2.4 ppm for free, unreacted PO A(1.2-1.0)=area of the resonance at 1.2-1.0 ppm for polyether polyol Taking into account the relative intensities the values for the polymer-bound carbonate ("linear carbonate" LC) in the reaction mixture were converted into mol % as per the following formula (VIII):

$$LC = \frac{A(5.1-4.8) - A(4.5)}{A(5.1-4.8) + A(2.4) + 0.33 * A(1.2-1.0)} * 100 \quad (VIII)$$

The weight fraction (in % by weight) of polymer-bound carbonate (LC) in the reaction mixture was calculated by formula (IX), $$LC = \frac{[A(5.1-4.8) - A(4.5)] * 102}{D} * 100\% \quad (IX)$$

where the value of D ("denominator" D) is calculated by formula (X):

$$D = [A(5.1-4.8) - A(4.5)] * 102 + A(4.5) * 102 + A(2.4) * 58 + 0.33 * A(1.2-1.0) * 58 \quad (X)$$

The factor of 102 results from the sum of the molar masses of $CO_2$ (molar mass 44 g/mol) and of propylene oxide (molar mass 58 g/mol); the factor of 58 results from the molar mass of propylene oxide.

The weight fraction (in % by weight) of cyclic carbonate (CC') in the reaction mixture was calculated by formula (XI):

$$CC = \frac{A(4.5) * 102}{D} * 100\% \quad (XI)$$

where the value of D is calculated by formula (X).

In order to calculate the composition based on the polymer component (consisting of polyether which has been formed from propylene oxide during the activation steps which take place under $CO_2$-free conditions, and polyethercarbonate polyol formed from starter, propylene oxide and carbon dioxide during the activation steps which take place in the presence of $CO_2$ and during the copolymerization) from the values for the composition of the reaction mixture, the non-polymeric constituents of the reaction mixture (i.e. cyclic propylene carbonate and any unconverted propylene oxide present) were mathematically eliminated. The weight fraction of the repeat carbonate units in the polyethercarbonate polyol was converted to a weight fraction of carbon dioxide using the factor F=44/(44+58). The figure for the $CO_2$ content in the polyethercarbonate polyol ("$CO_2$ incorporated"; see examples which follow and table 1) is normalized to the polyethercarbonate polyol molecule which has formed in the copolymerization and the activation steps.

The amount of cyclic propylene carbonate formed is determined via the mass balance of the total amount of cyclic propylene carbonate present in the reaction mixture and the amount of propylene carbonate used as the initial charge.

Examples 1 to 7: Preparation of Polyethercarbonate Polyols with Initial Charging of cPC as Suspension Medium and Continuous Metered Addition of Glycerol (Containing Component K)

Step (α):

136 mg of dried unactivated DMC catalyst were suspended in 120 g of 4-methyl-2-oxo-1,3-dioxolane (also referred to hereinafter as cyclic propylene carbonate or cPC) and the suspension was then introduced into a 1 L pressure reactor with a gas metering unit. The suspension was then heated up to 130° C. and was introduced with 26-30 L/h of nitrogen over the course of 30 min and, at the same time, a reduced pressure of 75-100 mbar was applied.

Step (β):

In the reactor, at 130° C., 1200 rpm and at a supply pressure of around 100 mbar which had been established with nitrogen, an amount of 10 g of propylene oxide (PO) was added all at once. The onset of the reaction was perceptible by a temperature peak ("hotspot") and by a pressure drop to the starting pressure. After the first pressure drop, the reactor was pressurized to p=50 bar with $CO_2$ and then a further 10 g of PO were added all at once for activation. After a delay, there was another temperature peak and the total pressure in the reactor showed a pressure decrease.

Step (γ):

On completion of activation, propylene oxide (482 g) at 2.2 g/min and 18 g of glycerol containing the type and amount of component K specified in table 1 below at 0.1 g/min were metered simultaneously into the reactor. At the same time, the reaction temperature was lowered from 130° C. at 1° C./min to 105° C. The progress of the reaction was monitored via the $CO_2$ consumption while continuously controlled topping-up kept the pressure in the reactor constant at the above-specified pressure (cf. step (β)). After the addition of PO had ended, stirring was continued at 105° C. and reaction pressure until the $CO_2$ consumption had abated (1200 rpm). This further reaction lasted for about 3 h. The $CO_2$ content incorporated in the polyethercarbonate polyol and the ratio of cyclic to linear carbonate were determined by means of $^1H$ NMR.

TABLE 1

Results of the polyethercarbonate polyol preparation

| Example | Component K: $H_3PO_4$ [ppm][a] | Cyclic/linear carbonate | $CO_2$ incorporated [% by wt.] |
|---|---|---|---|
| 1* | 104 ± 4[b] | 0.096 ± 0.007[b] | 17.8 ± 0.3[b] |
| 2* | 178 | 0.103 | 18.5 |
| 3* | 876 | 0.095 | 17.0 |
| 4 | 1279 | 0.077 | 17.1 |
| 5 | 4465 | 0.070 | 17.4 |
| 6 | 6660 | 0.066 | 18.0 |
| 7 | 7380 | 0.051 | 17.7 |

[a] Amount of component K reported is based on the content (ppm) in glycerol.
[b] Mean values ± standard deviation from 4 identical experiments.
*= comparative example Examples 8 and 9 for Continuous Preparation of Polyethercarbonate Polyols Example 8 (Comparative)

The following components were metered at the metering rates specified into a continuously operated 60 L pressure reactor having a gas metering unit and product discharge pipe, which had been initially charged with 32.9 L of a trifunctional polyethercarbonate polyol ($CO_2$ content: 21% by weight) containing 200 ppm of activated DMC catalyst, at 107° C. and 74 bar (absolute) while stirring (7 Hz):
propylene oxide at 7.83 kg/h
carbon dioxide at 2.6 kg/h
mixture of glycerol/propylene glycol (85% by weight/ 15% by weight) containing 0.69% by weight of DMC catalyst (unactivated) and 170 ppm (based on the starter mixture) of $H_3PO_4$ at 0.31 kg/h.

The reaction mixture was withdrawn continuously from the reactor via the product discharge pipe, such that the reaction volume (32.9 L) was kept constant. To complete the reaction, the reaction mixture was transferred into a postreactor (tubular reactor having reaction volume 10.4 L) which had been heated to 107° C. After a reaction time of 20 hours, a sample was taken downstream of the postreactor and this was used to determine, by means of $^1$H NMR, the incorporated $CO_2$ content and the ratio of cyclic to linear carbonate.
$CO_2$ incorporated: 20.67% by weight
Cyclic/linear carbonate: 0.140

Example 9

Example 9 was conducted analogously to example 8 (comparative), except that the amount of $H_3PO_4$ (based on the starter mixture) was increased from 170 ppm to 7000 ppm. After a reaction time of 20 hours, a sample was likewise taken downstream of the postreactor and this was used to determine, by means of $^1$H NMR, the incorporated $CO_2$ content and the ratio of cyclic to linear carbonate.
$CO_2$ incorporated: 21.95% by weight
Cyclic/linear carbonate: 0.084

The invention claimed is:

1. A process for preparing a polyethercarbonate polyol comprising adding alkylene oxides and carbon dioxide onto one or more H-functional starter substance(s) in the presence of a double metal cyanide catalyst or in the presence of a metal complex catalyst based on the metals zinc and/or cobalt, wherein
   (γ) one or more H-functional starter substance(s) containing at least 1000 ppm of component K are metered continuously into the reactor during the reaction, component K being selected from at least one compound containing a phosphorus-oxygen bond or a compound of phosphorus that is configured to form one or more P—O bond(s) by reaction with OH— functional compounds, wherein the one or more H-functional starter substance(s) containing at least 1000 ppm of component K and one or more alkylene oxide(s) are metered continuously into the reactor during the reaction in the presence of carbon dioxide, and wherein DMC catalyst is additionally metered continuously into the reactor and the resulting reaction mixture is removed continuously from the reactor; and
   (δ) the reaction mixture which is removed continuously in step (γ) and has a content of 0.05% by weight to 10% by weight of alkylene oxide is transferred into a postreactor in which, by way of a postreaction, the content of free alkylene oxide is reduced to less than 0.05% by weight in the reaction mixture.

2. The process as claimed in claim 1, wherein component K is used in an amount of 1000 ppm to 10 000 ppm.

3. The process as claimed in claim 1, wherein step (γ) is preceded by initial charging, in a step (α), of a suspension medium containing no H-functional groups together with DMC catalyst and in this step
   (α-1) no H-functional starter substance is initially charged in the reactor or
   (α-2) a portion of the H-functional starter substance(s) is additionally initially charged in the reactor.

4. The process as claimed in claim 3, wherein, after step (α) and before step (γ),
   (β) a portion of alkylene oxide is added to the mixture from step (α) at temperatures of 90 to 150° C., and wherein the addition of the alkylene oxide compound is then stopped.

5. The process as claimed in claim 3, wherein the suspension medium used in step (α) is at least one compound selected from the group consisting of 4-methyl-2-oxo-1,3-dioxolane, 1,3-dioxolan-2-one, acetone, methyl ethyl ketone, acetonitrile, nitromethane, dimethyl sulfoxide, sulfolane, dimethylformamide, dimethylacetamide, N-methylpyrrolidone, dioxane, diethyl ether, methyl tert-butyl ether, tetrahydrofuran, ethyl acetate, butyl acetate, pentane, n-hexane, benzene, toluene, xylene, ethylbenzene, chloroform, chlorobenzene, dichlorobenzene, carbon tetrachloride, ε-caprolactone, dihydrocoumarin, trimethylene carbonate, neopentyl glycol carbonate, 3,6-dimethyl-1,4-dioxane-2,5-dione, succinic anhydride, maleic anhydride and phthalic anhydride.

6. The process as claimed in claim 1, wherein step (γ) is preceded by initial charging, in a step (α), of a portion of the H-functional starter substance(s) together with DMC catalyst.

7. The process as claimed in claim 1, wherein, in step (γ), the metered addition of the one or more H-functional starter substance(s) containing at least 1000 ppm of component K is ended at a time prior to the addition of the alkylene oxide.

8. The process as claimed in claim 1, wherein component K is selected from at least one compound from the group consisting of phosphoric acid, phosphonic acid, phosphorous acid, phosphinic acid, phosphonous acid, phosphinous acid, phosphine oxides and salts, esters, halides and amides of phosphoric acid, phosphonic acid, phosphorous acid, phosphinic acid, phosphonous acid, phosphinous acid, phosphorus(V) sulfide, phosphorus tribromide, phosphorus trichloride and phosphorus triiodide.

9. The process as claimed in claim 1, wherein component K is selected from at least one compound from the group consisting of
   phosphoric acid,
   mono-, di- or trialkyl esters of phosphoric acid,
   mono-, di- or triaryl esters of phosphoric acid,
   mono-, di- or trialkaryl esters of phosphoric acid,
   $(NH_4)_2HPO_4$,
   phosphonic acid,
   mono- or dialkyl esters of phosphonic acid,
   mono- or diaryl esters of phosphonic acid,
   mono- or dialkaryl esters of phosphonic acid,
   phosphorous acid,
   mono-, di- or trialkyl esters of phosphorous acid,
   mono-, di- or triaryl esters of phosphorous acid,
   mono-, di- or trialkaryl esters of phosphorous acid,
   phosphinic acid, phosphonous acid and
phosphinous acid.

10. The process as claimed in claim 1, wherein component K is phosphoric acid.

11. The process as claimed in claim 1, wherein the one or more H-functional starter substance(s) are selected from at least one of the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane, pentaerythritol, sorbitol, polyethercarbonate polyols having a molecular weight Mn in the range from 150 to 8000 g/mol with a functionality of 2 to 3 and polyether polyols having a molecular weight Mn in the range from 150 to 8000 g/mol with a functionality of 2 to 3.

12. The process as claimed in claim 1, wherein, in step (γ), the one or more H-functional starter substance(s) are selected from at least one of the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane and pentaerythritol.

* * * * *